United States Patent [19]

Schmid

[11] 4,356,987

[45] Nov. 2, 1982

[54] SUPPORT CLIP FOR ELECTRICAL CONDUCTORS OR TUBES

[75] Inventor: August Schmid, Schwerzenbach, Switzerland

[73] Assignee: Patentverwertungs-und Finanzierungsgesellschaft SERANIA AG, Glarus, Switzerland

[21] Appl. No.: 257,926

[22] Filed: Apr. 27, 1981

[30] Foreign Application Priority Data

Apr. 28, 1980 [CH] Switzerland ................. 3246/80

[51] Int. Cl.³ ............................................. F16L 3/08
[52] U.S. Cl. ..................................... 248/73; 24/214; 248/74 A
[58] Field of Search ............. 248/73, 74 R, 74 A, 248/74 B, 74 PB, 220.2, 220.4, 221.3, 221.4, 222.4; 24/257, 21 H

[56] References Cited

U.S. PATENT DOCUMENTS

| | | | |
|---|---|---|---|
| 829,837 | 4/1906 | Brisacher | 24/214 |
| 3,179,969 | 4/1965 | Glynn | 24/214 X |
| 3,848,840 | 11/1974 | Umezu | 248/74 PB X |

*Primary Examiner*—Roy D. Frazier
*Assistant Examiner*—Ramon O. Ramirez
*Attorney, Agent, or Firm*—W. G. Fasse; D. H. Kane, Jr.

[57] ABSTRACT

For releasably attaching electrical conductors 11 or small tubes, the invention provides a U-shaped clip made of a resilient plastics material, which can be plugged into a bore 12 in a support panel 8. The electrical conductors 11, or the like, are held between the two shanks or legs 3 and the crosspiece 4 which connects the latter, and are pressed against the panel 8. In the inserted state, the grooves 6 provided on the shanks 3 engage in the edge of the bore 12. To release the clip, the two shanks 3 are pressed together by finger pressure. This makes it particularly simple to attach the conductors or tubes to the panel.

3 Claims, 3 Drawing Figures

SUPPORT CLIP FOR ELECTRICAL CONDUCTORS OR TUBES

BACKGROUND OF THE INVENTION

The invention relates to a clip for releasably attaching electrical conductors or tubes to a support.

The conventional way of attaching cables or the like to a support consists in using straps; however, this has the disadvantage that tapped holes are necessary to attach them.

OBJECTS OF THE INVENTION

Accordingly, an object of the present invention is to provide a clip which is very simple and cheap and with which a secure, easily released attachment of electrical conductors or tubes to a support is possible without to tap a bore.

SUMMARY OF THE INVENTION

According to the invention, a clip for releasably attaching electrical conductors, or tubes, to a support is characterised in that the clip is made as a U-shaped, spring component, the two free shank ends of which are externally tapered, and each of the two shanks has a groove which is open towards the outside and is intended for fixing in bore in the support, said clip when fixed to said support defining a space for holding said conductors or tubes between said support and its crosspiece which connects the shanks.

By means of such a clip, the attachment of cables or the like to a support, and particularly a panel or the like, can be speeded up and simplified. Moreover removal of the clip is possible simply with finger pressure and the clip is insertable into a round hole.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
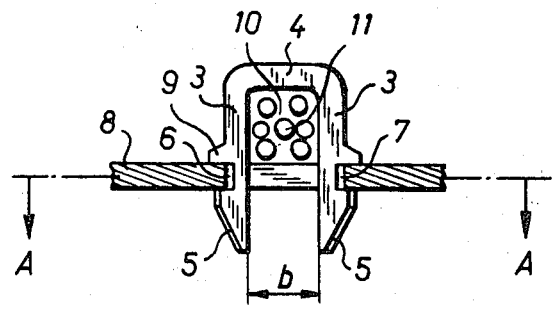
FIG. 1 is a side view of the clip which is inserted in a panel.
Figure 2:
FIG. 2 is a plan view of the clip.
Figure 3:
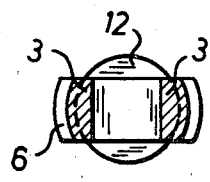
FIG. 3 is a section along the line A—A in FIG. 1.

The clip is made as a U-shaped, spring type or resilient plastic component, and has two shanks or legs 3, extending approximately parallel, which are connected to each other via a crosspiece 4. The free ends of the shanks 3 are each provided on their outer face with outwardly facing sloping or tapering surface 5 so that the shank ends taper downwardly as shown in FIG. 1. In the middle region between the sloping surfaces 5 and the crosspiece 4 there is a rectangular groove 6 in each of the two shanks, which is open towards the outside, and the base of which is curved in the shape of an arc. These two grooves 6 of the clip engage in a round aperture or bore 12 in a support 8, particularly a flat panel 8. On the shanks or legs 3 on either side of the groove 6 there is a shoulder 9 which projects out beyond the thickness of the shanks or legs 3. Between the inner face of the crosspiece 4 and the panel 8 there is a space 10 for holding electrical conductors 11, particularly cables, wires or small tubes or hoses made of plastic or metal, such as those used for hydraulic or pneumatic controls, for example.

The clip is attached by first drilling the bore 12 or hole in the panel 8 with a diameter which is somewhat larger than the clear width b between the two shanks 3. The clip can then be inserted from above into this bore 12 by pressure, the electrical conductor or the tubing involved being held between the shanks 3.

In the region of the grooves 6 the two shanks 3 lock in the edge of the bore 12 under a spring cause and thereby effect the fixing of the conductors or tube in place. In the locked state the two shanks 3 tend to spread with a slight amount of prestressing. If the clip has to be removed again, it is only necessary to exert inwardly-directed pressure on the two shanks 3 so that the shanks 3 are released again. The clip can rotate in the bore 12 and can thereby adapt to the position of the attached cable or tube.

Although the invention has been described with reference to specific example embodiments, it will be appreciated, that it is intended, to cover all modifications and equivalents within the scope of the appended claims.

What is claimed is:

1. A clip for releasably attaching electrical conductors, wires, or hose means to a support, comprising a bail made of plastics material and having two legs (3) and a crosspiece (4) elastically interconnecting the legs at one end thereof for elastically moving the legs toward each other for inserting the legs into a bore in a support, each leg having a free end with an outside taper facing away from the respective opposite leg, said legs normally extending substantially in parallel to each other at a given spacing (b) from each other, each leg having an outwardly facing groove (6) and a shoulder (9) adjacent to the respective groove on the side of the groove nearest said crosspiece (4), each of said grooves having an outwardly curved bottom for insertion into a round bore, whereby said legs and the crosspiece confine together with a support a space for holding conductors, wires or hose means.

2. The clip of claim 6, wherein said plastics material is polypropylene.

3. A device for releasably holding wires, electrical conductors, or hose means to a support, comprising a support (8), at least one round through bore (12) in said support, at least one clip comprising a bail made of plastics material and having two legs (3) and a crosspiece (4) elastically interconnecting the legs at one end thereof for elastically moving the legs toward each other for insertion and removal of the clip in said through bore (12), each leg having a free end with an outside taper facing away from the respective opposite leg, said legs normally extending in parallel to each other at a given spacing (b) from each other, each leg having an outwardly facing groove (6) and a shoulder (9) adjacent to the respective groove on the side of the groove nearest said crosspiece (4), said shoulder (9) resting on one surface of said support, each of said grooves (6) having an outwardly curved bottom resting against an edge of said round through bore in said support for locking said grooves in said round through bore, whereby a holding space is confined between said bail and said support.

* * * * *